(12) United States Patent
Ishii et al.

(10) Patent No.: US 8,305,713 B2
(45) Date of Patent: Nov. 6, 2012

(54) HEAD STACK LATCH ASSEMBLY

(75) Inventors: Tomokazu Ishii, Yohokama (JP); Seong Woo Kang, San Jose, CA (US); Seungman Chang, Redwood City, CA (US); Chaw-Wu Tseng, San Jose, CA (US)

(73) Assignee: Seagate Technology International, Scotts Valley, CA (US)

( * ) Notice: Subject to any disclaimer, the term of this patent is extended or adjusted under 35 U.S.C. 154(b) by 439 days.

(21) Appl. No.: 12/436,715

(22) Filed: May 6, 2009

(65) Prior Publication Data
US 2010/0284113 A1 Nov. 11, 2010

(51) Int. Cl.
*G11B 5/54* (2006.01)
(52) U.S. Cl. .................................... 360/256.2
(58) Field of Classification Search ............ 360/256
See application file for complete search history.

(56) References Cited

U.S. PATENT DOCUMENTS

| 7,633,721 B1* | 12/2009 | Little et al. | 360/256.2 |
| 7,660,075 B1* | 2/2010 | Lin et al. | 360/256.2 |
| 7,684,155 B1* | 3/2010 | Huang et al. | 360/256 |
| 7,715,149 B1* | 5/2010 | Liebman et al. | 360/256.2 |
| 2003/0189795 A1* | 10/2003 | Chang et al. | 360/256.2 |
| 2010/0246070 A1* | 9/2010 | Son et al. | 360/265.1 |
| 2010/0271733 A1* | 10/2010 | Kim | 360/236.6 |

* cited by examiner

*Primary Examiner* — Amir Zarabian
*Assistant Examiner* — Pablo Huerta

(57) ABSTRACT

This application discloses a Load-UnLoad (LUL) hard disk drive comprising a disk base, a spindle motor mounted on the disk base for rotating at least one disk to create at least one rotating disk surface, and a head stack assembly pivotably coupled to the disk base and configured to engage an actuator latch when the sliders of the head stack assembly are to be parked. The actuator latch includes a latch beam coupled through a latch pivot to the disk base and a boss coupled to the latch beam and configured to limit the stroke of latch motion in the event of a rotary non-operational shock.

14 Claims, 6 Drawing Sheets

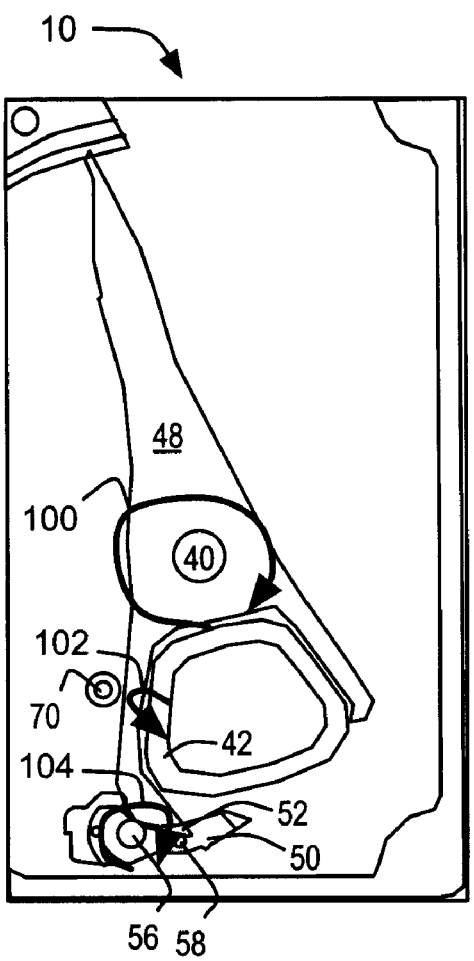
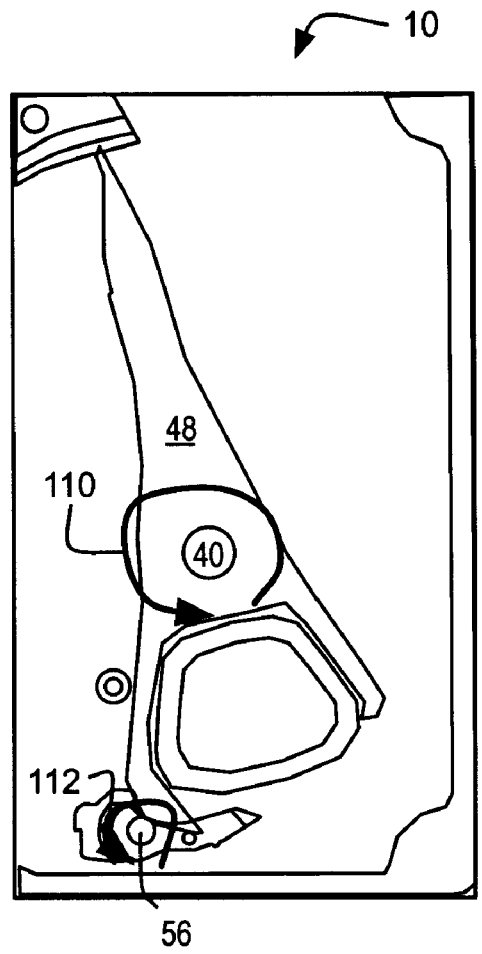
Fig. 8A    Fig. 8B
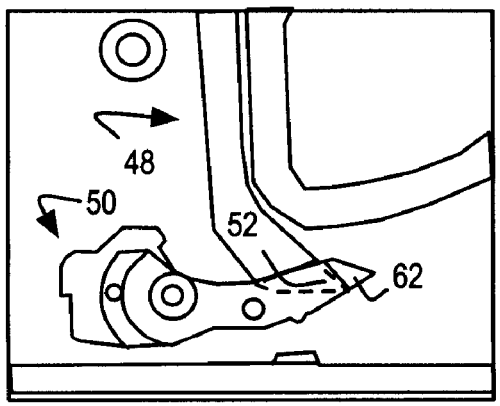
Fig. 9

HEAD STACK LATCH ASSEMBLY

TECHNICAL FIELD

This invention relates to an actuator latch in a Load-UnLoad (LUL) hard disk drive to minimize the effects of non-operational rotary shocks.

BACKGROUND OF THE INVENTION

Actuator latches have been used for many years to restrain actuator motion when the sliders are not operational in a Load-UnLoad (LUL) hard disk drive. The sliders are often referred to as "parked" in that there is some protection from undesirable effects from shocks in such situations. These hard disk drives are often used in systems such as a portable media player or notebook computer. Engaging existing approaches may lead to a bouncing condition that can entail a read-write head coming lose and striking the disk surface, possibly damaging the hard disk drive.

SUMMARY OF THE INVENTION

Embodiments of the invention include a Load-UnLoad (LUL) hard disk drive comprising a disk base, a spindle motor mounted on the disk base for rotating at least one disk to create at least one rotating disk surface, and a head stack assembly pivotably coupled to the disk base and configured to engage an actuator latch when the sliders of the head stack assembly are to be parked. The actuator latch includes a latch arm pivotably mounted through a latch pivot to the disk base and a boss coupled to the latch arm and configured to limit the stroke of motion of the head stack assembly in the event of a rotary non-operational shock. As used herein, a non-operational shock refers to a mechanical shock experienced by the hard disk drive while its sliders are parked. As used herein a rotary shock is in the plane of the disk base and tends to cause the head stack assembly to rotate about its pivot. The boss includes a shock absorbing material that limits the bounce of the head stack assembly in the actuator latch thereby limiting the potential for the sliders to be damaged.

The boss may be inserted into the latch arm or formed through molding and machining as part of the latch arm. The boss may flexibly mounted to the latch arm and/or the boss may be hollow. The boss may be made of a shock absorbing material such as a form of PolyOxyMethylene (POM), for instance POM HD450.

BRIEF DESCRIPTION OF THE DRAWINGS

FIGS. 8A and 8B show example embodiments of the hard disk drive in its parking position in non-operational mode responding to clockwise and counterclockwise rotary shock respectively.

FIG. 9 shows the latch trigger of the head stack assembly being caught by the hook of the latch assembly in response to moderate levels of rotary shock as shown in FIGS. 8A and 8B.

DETAILED DESCRIPTION

This invention relates to an actuator latch in a Load-UnLoad (LUL) hard disk drive to minimize the effects of non-operational rotary shocks. Embodiments of the invention include a Load-UnLoad (LUL) hard disk drive comprising a disk base, a spindle motor mounted on the disk base for rotating at least one disk to create at least one rotating disk surface, and a head stack assembly pivotably coupled to the disk base and configured to engage an actuator latch when the sliders of the head stack assembly are to be parked. The actuator latch includes a latch arm coupled through a latch pivot to the disk base and a boss coupled to the latch arm and configured to limit the stroke of latch motion in the event of a rotary non-operational shock. As used herein, a non-operational shock refers to a mechanical shock experienced by the hard disk drive while its sliders are parked. As used herein a rotary shock is in the plane of the disk base and tends to cause the head stack assembly to rotate about its pivot.

Figure 1:
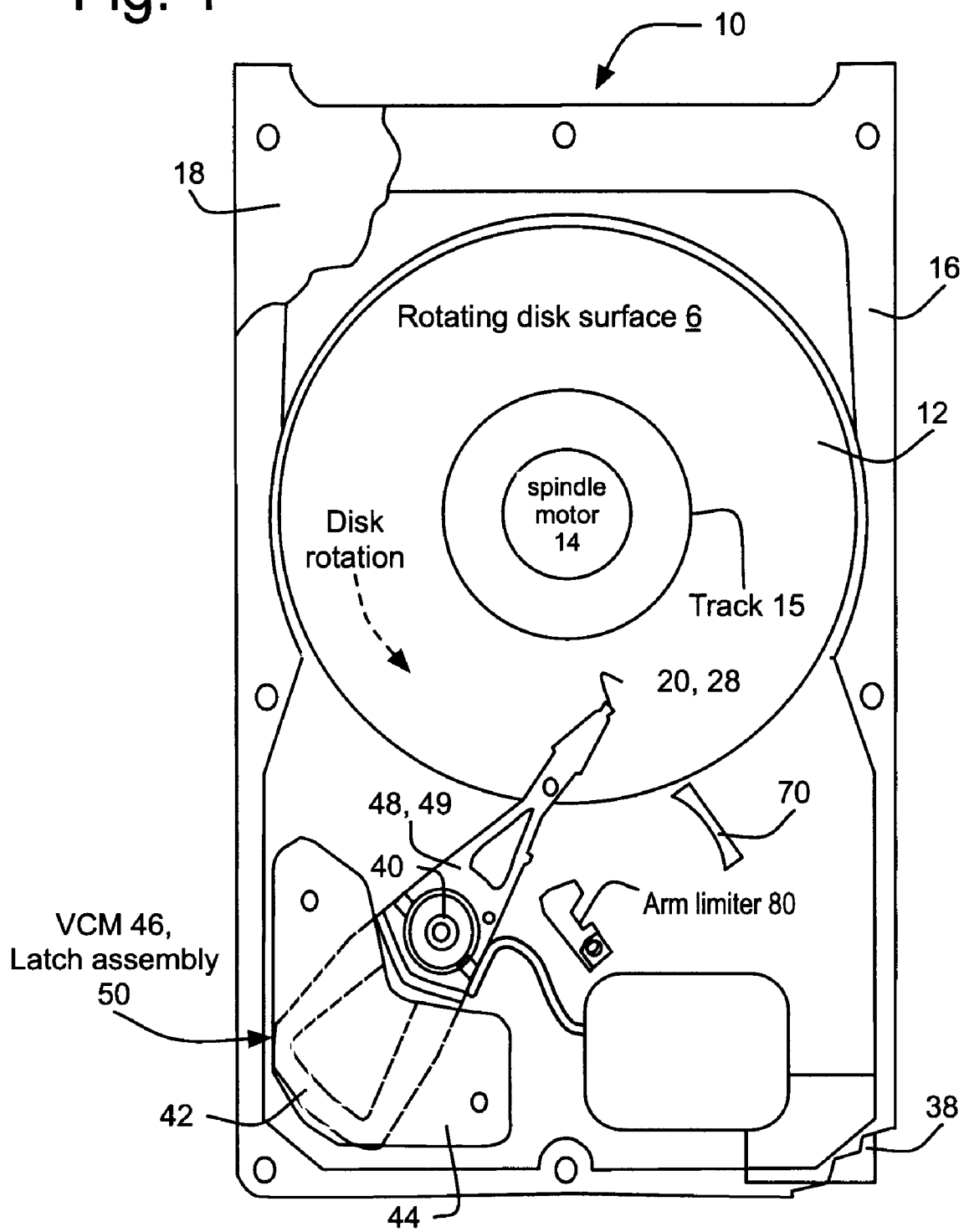
FIG. 1 shows an example of an embodiment of the invention as a Load-UnLoad (LUL) hard disk drive including a disk base to which a spindle motor is mounted with at least one disk rotatably coupled to the spindle motor to create a rotating disk surface. A voice coil motor includes a head stack assembly is pivotably coupled to the disk base and engaging a latch assembly to park the sliders on a slider ramp mounted on the disk base. The latch assembly in accord with this invention further protects the head stack assembly in the event of a non-operational rotary shock as will be shown in the following Figures. Parking the sliders may also possibly position the actuator arms near an arm limiter mounted on the disk base to further protect the sliders from non-operational shocks.

Referring to the drawings more particularly by reference numbers, FIG. 1 shows an example of an embodiment of the invention as a Load-UnLoad (LUL) hard disk drive 10 including a disk base 2 to which a spindle motor 14 is mounted with at least one disk 8 rotatably coupled to the spindle motor to create a rotating disk surface 6. A voice coil motor 46 includes a head stack assembly 48 pivotably mounted by an actuator pivot 42 to the disk base, responsive to its voice coil 42 interacting with a fixed magnetic assembly 44 mounted on the disk base and including an actuator arm 49 coupled to a head gimbal assembly 28 and configured to position at least one slider 20 to access data stored in a track 15 on the rotating disk surface. The head stack assembly engages a latch assembly 50 to park the sliders on a slider ramp 70 mounted on the disk base. The latch assembly in accord with this invention protects the head stack assembly in the event of a non-operational rotary shock as will be shown in the following Figures. Parking the sliders may also possibly position the actuator arms near an arm limiter 80 mounted on the disk base to further protect the sliders from non-operational shocks.

The loader ramp 70 may mounted to the disk base either near the inside diameter of the disks 12 or near the outside diameter and configured to support the head gimbal assemblies 28 when the hard disk drive 10 is non-operational.

The hard disk drive 10 may include an assembled circuit board 38 also mounted on the disk base 16 opposite the spindle motor 14 and the voice coil motor 46. A disk cover 4 is mounted on the disk base to encapsulate all of the shown components except the assembled circuit board.

The hard disk drive 10 may access the data arranged in tracks 15 on the rotating disk surface 6 by controlling the spindle motor 14 to rotate the disks 8 at a specified rate. The data may be organized as tracks that may be configured as concentric circles or as a tightly packed spiral. The voice coil motor 46 operates by stimulating the voice coil 32 with a time varying electrical signal to magnetically interact with the fixed magnet assembly 34 causing the head stack assembly 12 to pivot about the actuator pivot 40 moving the head gimbal assembly 28 to position the slider 20 near the track on the rotating disk surface. In many embodiments, a micro-actuator assembly coupled to the slider may be further stimulated to further control the position of the slider. A vertical micro-actuator either in the micro-actuator assembly or in the slider, may be stimulated to alter the flying height of the slider over the rotating disk surface.

Figure 2:
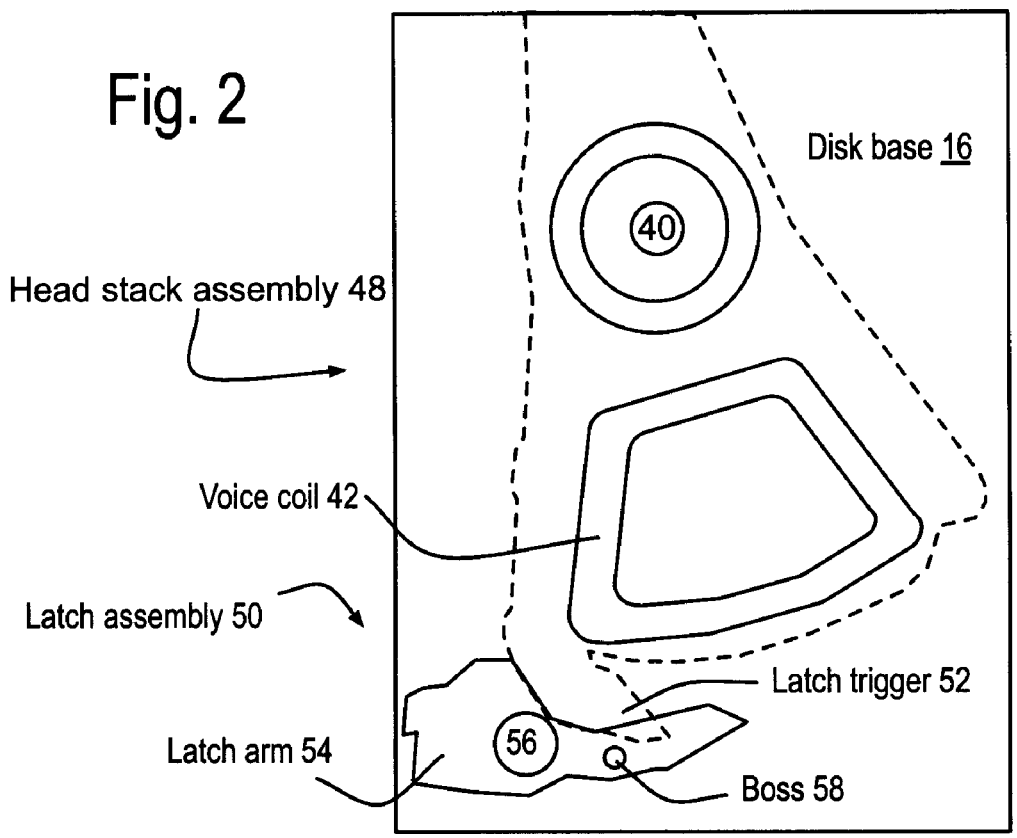
FIG. 2 shows the latch assembly of FIG. 1 with the fixed magnet assembly removed. The latch assembly includes a latch arm pivotably coupled through a latch pivot to the disk base. A boss is coupled to the latch arm and configured to limit the stroke of latch motion in the event of a rotary non-operational shock. As used herein, a non-operational shock refers to a mechanical shock experienced by the hard disk drive while its sliders are parked. As used herein a rotary shock is in the plane of the disk base and tends to cause the head stack assembly to rotate about its pivot.

FIG. 2 shows the latch assembly 50 of FIG. 1 with the fixed magnet assembly 44 removed. The latch assembly includes a latch arm 54 pivotably coupled through a latch pivot 56 to the disk base 16. A boss 58 is coupled to the latch beam 63 that is rigidly coupled to the latch arm and configured to limit the stroke of latch motion on the head stack assembly 48 in the event of a rotary non-operational shock. As used herein a rotary shock is in the plane of the disk base and tends to cause the head stack assembly to rotate about the actuator pivot 40.

Figure 3:
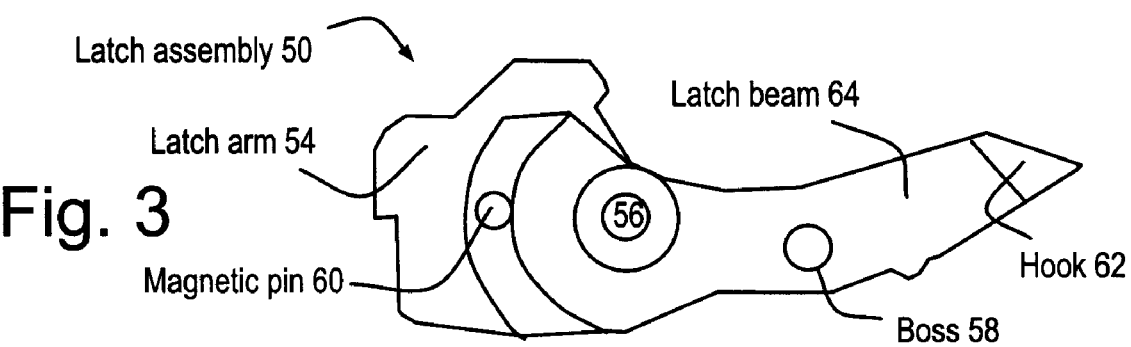
FIGS. 3 to 7 show various configurations of the boss in accord with the invention.
Figure 5:
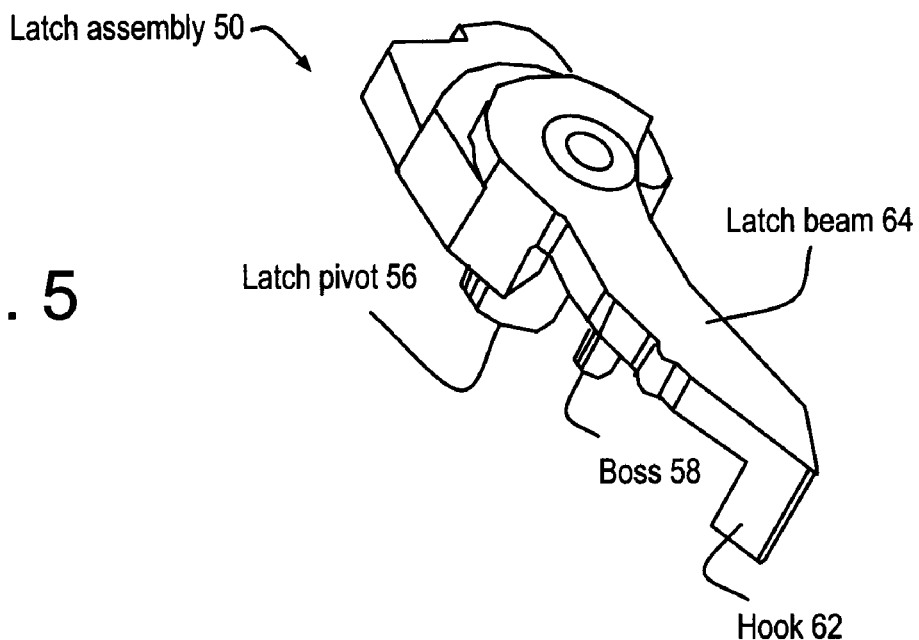
Figure 6:
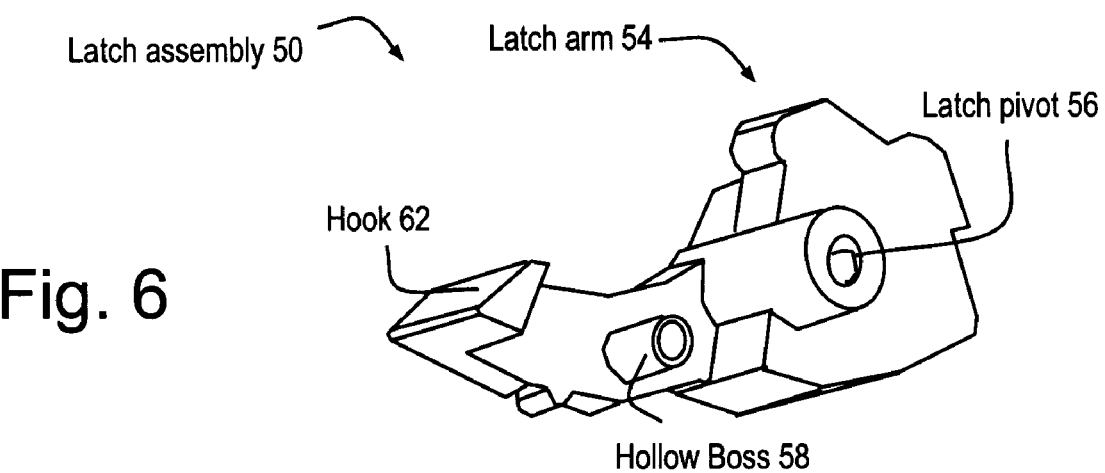
Figure 7:
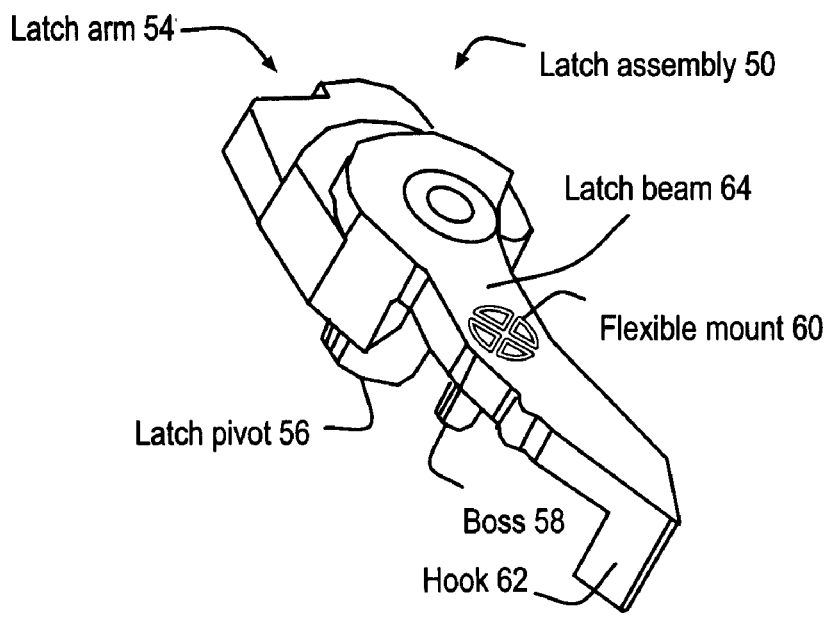

The boss 58 may be inserted into the latch beam 64 as shown in FIGS. 3 and 7 or formed through molding and machining as part of the latch beam as shown in FIG. 5. The boss may flexibly mounted 60 to the latch beam as shown in FIG. 7 and/or the boss may be hollow as shown in FIG. 6. The boss may be made of a shock absorbing material such as a form of PolyOxyMethylene (POM), for instance POM HD450.

Figure 4:
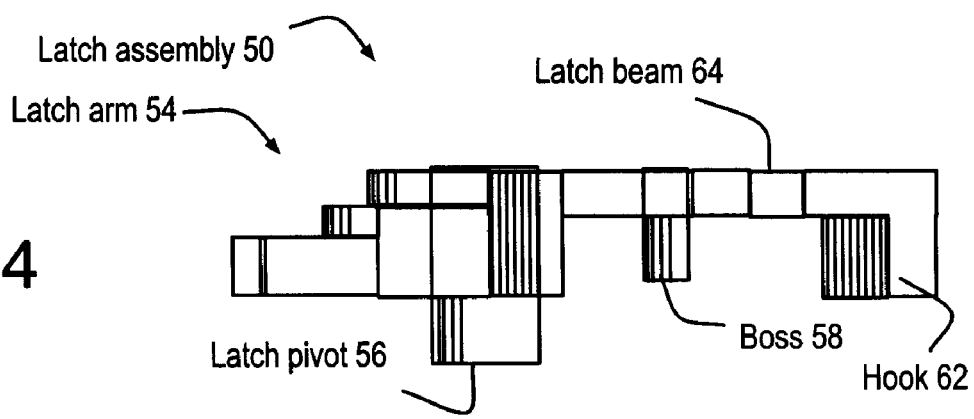

In further detail, FIG. 3 shows a top view of the latch beam 64 with the boss 58 inserted into the latch arm. FIG. 4 shows a side view of the latch assembly 50. FIG. 5 shows a perspective view of the latch assembly including the boss when formed by a process of molding and possibly machining. FIG. 6 shows the latch beam with a hollow boss. And FIG. 7 shows the latch beam with a flexible mount 60 for the boss.

FIGS. 8A to 12 show the operation of embodiments of the hard disk drive 10 responding to rotary shock events while not operating to access the data on a rotating disk surface, a mode referred to herein as the non-operational mode. These Figures as well as FIGS. 13 and 14 do not show the fixed magnet assembly 44, because the operations being performed occur at least partly under the assembly, which would obscure the portrayal of these operations.

FIGS. 8A and 8B show example embodiments of the hard disk drive in its parlking position in non-operational mode responding to clockwise and counterclockwise rotary shock respectively. At the beginning of the non-operational mode, the magnetic pin 60 shown in FIG. 3 attracts the voice coil 42 shown in FIGS. 1 and 2 to urge the head stack assembly 48 into this parked configuration. FIG. 8A shows the head stack assembly responding to a clockwise rotary shock 100 about the actuator pivot 40 that causes the latch trigger 52 to contact the boss 58, making the latch assembly 50 to rotate clockwise 104 about the latch pivot 56. This clockwise motion of the head stack assembly is stopped 102 by the outer crash stop 70 and the latch trigger may be caught by the hook 62 as shown in FIG. 9.

FIG. 8B shows the head stack assembly 48, possibly in response to the clockwise rotary shock 100 from bouncing 102 off the outer crash stop 70 of FIG. 8A, moving in a counterclockwise rotary shock 110 about the actuator pivot 40 with the latch assembly rotating counterclockwise 112 about the latch pivot.

FIG. 9 shows the latch trigger 62 of the head stack assembly 38 being caught by the hook 62 of the latch assembly 50 in response to moderate levels of rotary shock as shown in FIGS. 8A and 8B keeping the latch assembly and the head stack assembly closed in non-operational mode.

Figure 10:
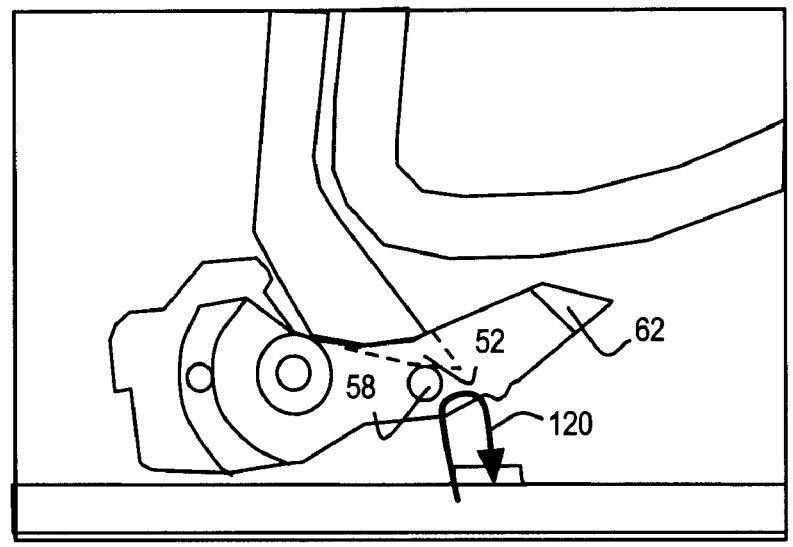
FIG. 10 shows the technical problem this invention solves, when the rotary shock is very large the latch lever may bounce off the boss, leading to the release of the latch assembly as shown in FIG. 11.
Figure 11:
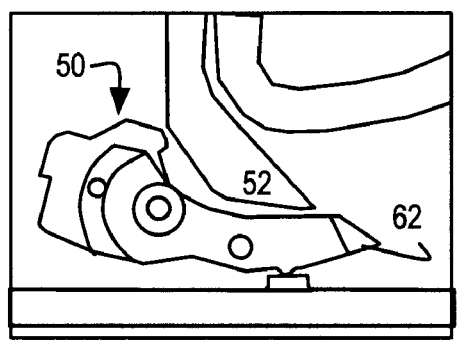

FIG. 10 shows the technical problem this invention solves, when the rotary shock is very large the latch lever 52 may bounce off 120 the boss 58, leading to the release of the latch assembly 50 as shown in FIG. 11.

Figure 12A:
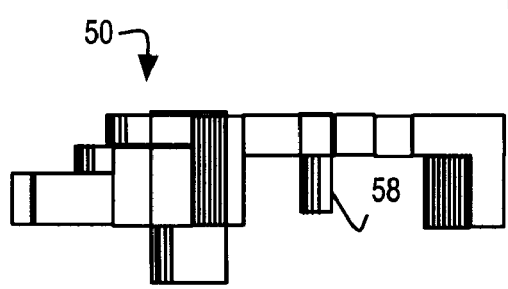
FIG. 12A shows the latch assembly and its boss shortly before the event where the latch trigger would bounce.
Figure 12B:
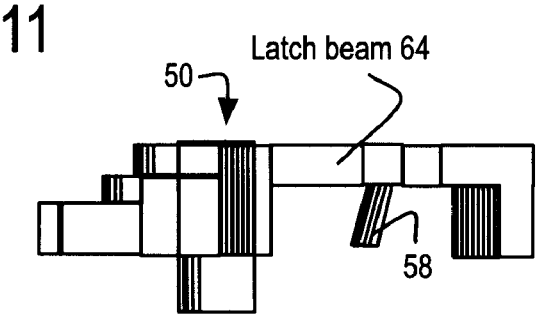
FIG. 12B shows the boss bending to absorb the shock and keep the latch assembly from failing to hold the latch trigger.

The solution to this problem is that the boss 58 is composed of a shock absorbing material as previously discussed. FIGS. 12A shows the latch assembly 50 and its boss shortly before the event where the latch trigger 62 would open. FIG. 12B shows the boss bending to absorb the shock while the latch beam 64 remains essentially rigid and the latch assembly is kept from failing to hold the latch trigger 52.

Figure 13:
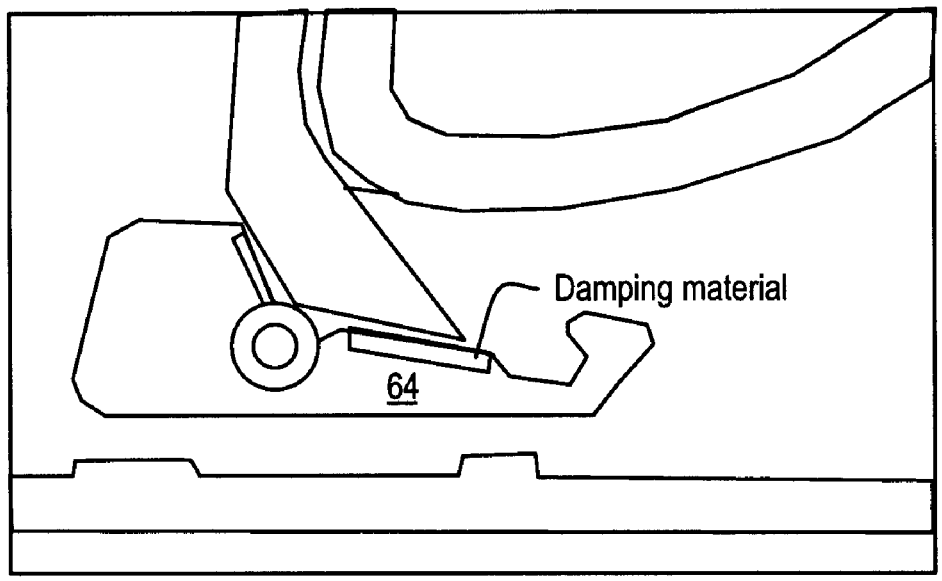
FIG. 13 shows a prior art latch assembly including damping material on one wall to limit shock, but weakening the latch arm in other ways.

FIG. 13 shows a prior art latch assembly including damping material on a side wall of its latch beam 64 to limit shock, but weakening the latch beam, because the thicker the dampening material the thinner the latch beam is behind the damping material.

Figure 14:
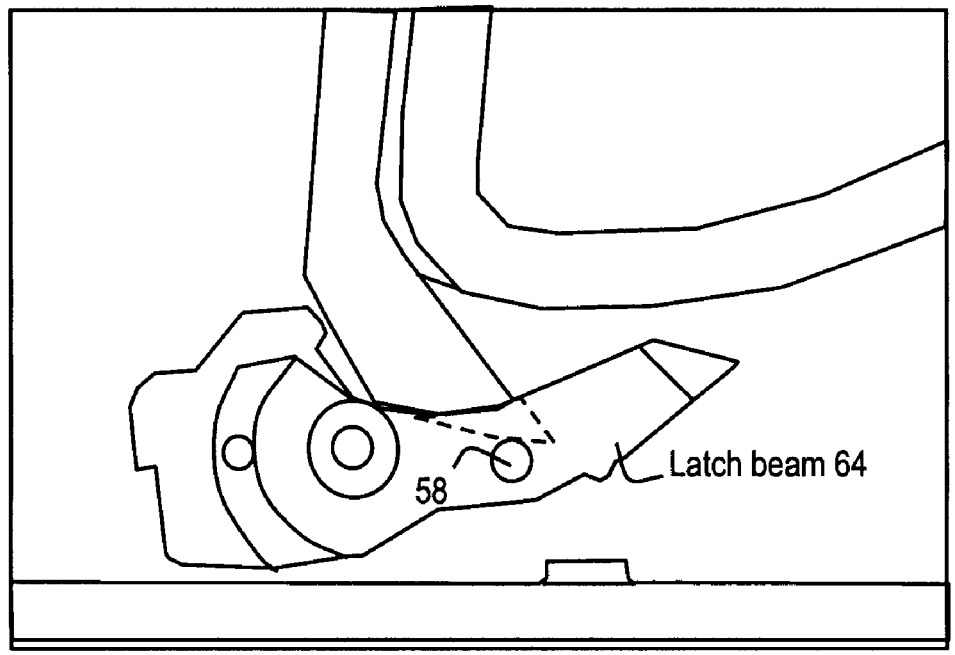
FIG. 14 shows the example embodiment of this invention where the damping material in the boss does not adversely affect the strength of the latch arm.

FIG. 14 shows the example embodiment of this invention where the damping material in the boss 58 does not adversely affect the strength of the latch beam 64. The boss can be made thicker without sacrificing the strength of the latch beam allowing the dampening effect of the boss to be independently tuned to a greater degree of freedom in terms of the latch beam parameters than the prior art latch assembly shown in the example of FIG. 13.

The preceding embodiments provide examples of the invention, and are not meant to constrain the scope of the following claims.

What is claimed is:

1. An apparatus, comprising:
   a latch assembly pivotably mounted through a latch pivot to a disk base and coupled through a latch beam to a boss made of a shock absorbing material; and
   a head stack assembly pivotably mounted to said disk base and configured to engage said latch assembly with said boss, wherein
      said boss is configured to limit motion of said head stack assembly in response to a non-operational rotary shock, and
      said latch assembly is configured to respond to a clockwise rotary shock event by rotating clockwise.

2. The apparatus of claim 1, wherein said boss is inserted into said latch beam.

3. The apparatus of claim 1, wherein said boss is molded as part of said latch beam.

4. The apparatus of claim 1, wherein said latch beam couples through a flexible mount to said boss.

5. The apparatus of claim 1, wherein said boss is hollow.

6. The apparatus of claim 1, wherein said shock absorbing material is a form of PolyOxyMethylene (POM).

7. A method, comprising:

bending of a boss by a latch trigger in a head stack assembly in response to a rotary shock to absorb said rotary shock; and maintaining said latch trigger near a latch assembly including said boss to retain said head stack assembly in a parked position, wherein said latch assembly is configured to respond to a clockwise rotary shock event by rotating clockwise.

8. The method of claim 7, wherein said latch assembly further includes a latch beam coupled to a latch pivot, said boss and a hook, and said latch pivot pivotably coupled to a disk base in said hard disk drive; and further comprising rigidly pivoting said latch assembly about said latch pivot for said latch beam to position said hook to close on said latch trigger.

9. The method of claim 8, wherein said boss is inserted into said latch beam.

10. The method of claim 8, wherein said boss is molded as part of said latch beam.

11. The method of claim 8, wherein said latch beam couples through a flexible mount to said boss.

12. The method of claim 8, wherein said boss is hollow.

13. The method of claim 8, wherein said boss includes a shock absorbing material.

14. The method of claim 13, wherein said shock absorbing material is a form of PolyOxyMethylene (POM).

* * * * *